United States Patent [19]

Harvey

[11] 4,132,469

[45] Jan. 2, 1979

[54] APPARATUS FOR SELECTIVELY VIEWING A PLURALITY OF RECORDING ELEMENTS

[75] Inventor: Donald M. Harvey, Webster, N.Y.

[73] Assignee: Eastman Kodak Company, Rochester, N.Y.

[21] Appl. No.: 774,719

[22] Filed: Mar. 7, 1977

[51] Int. Cl.² .................. G03B 23/06; G03B 23/10
[52] U.S. Cl. ............................. 353/25; 353/110; 358/102
[58] Field of Search ............ 358/54, 102, 215, 216; 354/7; 353/25, 110, 108

[56] References Cited

U.S. PATENT DOCUMENTS

| | | | |
|---|---|---|---|
| 1,215,975 | 2/1917 | Palmer | 353/108 |
| 3,421,802 | 1/1969 | Irazoqui | 353/25 |
| 3,790,707 | 2/1974 | Valenta | 358/216 |
| 3,959,801 | 5/1976 | Booth | 354/7 |

FOREIGN PATENT DOCUMENTS 2438913  2/1976  United Kingdom ................ 353/25

Primary Examiner—Steven L. Stephan
Attorney, Agent, or Firm—D. M. Woods

[57] ABSTRACT

Apparatus for viewing image frames from interchangeable sets of disk-like photographic film units, preferably through a standard television receiver. The film units define sector-shaped, peripherally located notches and are accumulated on a spindle with the notches aligned on a common axis extending parallel to the spindle. The apparatus is provided with a carriage for receiving the interchangeable sets in a predetermined orientation, and includes an optical head, and means for relatively indexing the film units and the optical head both axially and rotationally. The notches accommodate the optical head and facilitate the relative axial indexing to select a particular film unit for viewing. The selected film unit is then released for rotation on the spindle, to present the desired frame to the optical head.

4 Claims, 7 Drawing Figures

APPARATUS FOR SELECTIVELY VIEWING A PLURALITY OF RECORDING ELEMENTS

CROSS-REFERENCE TO RELATED APPLICATIONS

Reference is made to commonly-assigned copending U.S. patent applications Ser. No. 774,716, entitled PHOTOGRAPHIC FILM UNIT AND CARTRIDGE ASSEMBLY; Ser. No. 774,715, entitled PHOTOGRAPHIC CAMERAS; and Ser. No. 774,722, entitled METHOD AND APPARATUS FOR TREATING PHOTOGRAPHIC FILM ELEMENTS all in the name of Donald M. Harvey; and to Ser. No. 774,721, entitled APPARATUS FOR PROCESSING PHOTOGRAPHIC FILM, filed in the name of David L. Patton; Ser. No. 774,717, entitled IMPROVED ROTARY FILM PROCESSING APPARATUS, filed in the name of William J. Hutchinson, Ser. No. 774,720, entitled IMPROVED VERTICAL FILM PROCESSING APPARATUS, filed in the name of William J. Hutchinson, and now abandoned, and Ser. No. 774,718, entitled IMPROVED HORIZONTAL FILM PROCESSING APPARATUS, filed in the name of Victor C. Solomon, and now abandoned, all on even date herewith.

BACKGROUND OF THE INVENTION

The present invention relates to apparatus for selectively viewing information from a plurality of recording elements. More specifically, the invention relates to such apparatus having particular utility with interchangeable sets of photographic units which include a circular information-bearing strip interrupted by a notched-out portion or open sector.

The prior art can be classified into numerous categories of viewing devices, including various types of projectors for presenting images on a screen, video players for displaying information through television receivers, and viewers for inspecting recording elements directly. Typical examples are disclosed in U.S. Pat. Nos. 3,146,666, 3,276,314, 3,778,545, and 2,511,334. Certain of the prior art devices, most noteably relating to photocomposing machines, are specifically adapted for selectively viewing information from a plurality of character disks. Examples of this type are disclosed in U.S. Pat. Nos. 2,767,628; 3,099,945; 3,339,470; 3,791,271; and 3,959,801. Of particular interest is U.S. Pat. No. 2,989,904, which discloses a photo-type composing machine for selectively projecting images from a plurality of character disks having circular strips of information interrupted by an open sector. As there disclosed, the character disks are accumulated on an axis of rotation, defined by a spindle, with their open sectors aligned apparently to facilitate axial indexing of the disks relative to the viewing optics. Rotational indexing of the selected disk provides for viewing particular information on that disk.

While prior art devices, such as those mentioned above, appear to be satisfactory for their intended purposes, previous teachings have not offered solutions to the many difficult problems that arise when interchangeable sets of accumulated photographic disks are to be viewed, for example, in a consumer environment. Convenient handling of the disks while they are removed from the apparatus is a typical problem. Others relate to interchanging the sets, i.e., the loading and unloading of the apparatus, and the requirements of convenient, reliable operation at a reasonable cost for the consumer. Until these and similar problems are solved, the advantages of such apparatus, even though available in sophisticated equipment to skilled users, will not be accessible to the consumer.

The above and other problems that are alleviated by the present invention will become more apparent from an examination of the prior art in connection with the following description.

SUMMARY OF THE INVENTION

In accordance with the present invention, apparatus is provided for selectively viewing a plurality of recording elements, such as circular or polygonal units, which are accumulated in sets on a common axis. The sets are conveniently interchangeable in the apparatus and can be accumulated in a manner which facilitates handling and storage of the elements between viewings.

The elements include a flat support disk, bearing a circular strip of information interrupted by a notched-out portion or open sector where the support is discontinuous. The apparatus receives a set of the elements with the open sectors aligned parallel to the common axis to accommodate a viewing head and to facilitate axial indexing of the head relative to the recording elements. In this manner, a selected element to be viewed is located in an appropriate plane for viewing. The apparatus also includes means for releasing the selected element from its open sector aligned position and for rotatably indexing that element relative to the viewing head while maintaining the aligned condition of the other elements.

In the preferred embodiment, a set of the photographic units are accumulated on a spindle which includes a releasable key for aligning the open sectors of the units parallel to the spindle. The apparatus is a projector and receives the spindle with the open sectors rotationally oriented to accommodate projection optics. Upon such loading, a sector key engages the open sectors, releases the spindle key, and takes over from the spindle key to prevent rotation of all but one of the film units away from the aligned orientation. The sector key also defines a gate, part of the projection optics, in which the one film unit is released for rotation in the viewing plane.

Still other aspects of the invention and more specific features will become apparent to those skilled in the art from the following description with reference to the accompanying drawings.

BRIEF DESCRIPTION OF THE DRAWINGS

To assist in the detailed description of the preferred embodiment of the invention, reference is made to the accompanying drawings, in which.

DESCRIPTION OF PREFERRED EMBODIMENT

Figure 1:
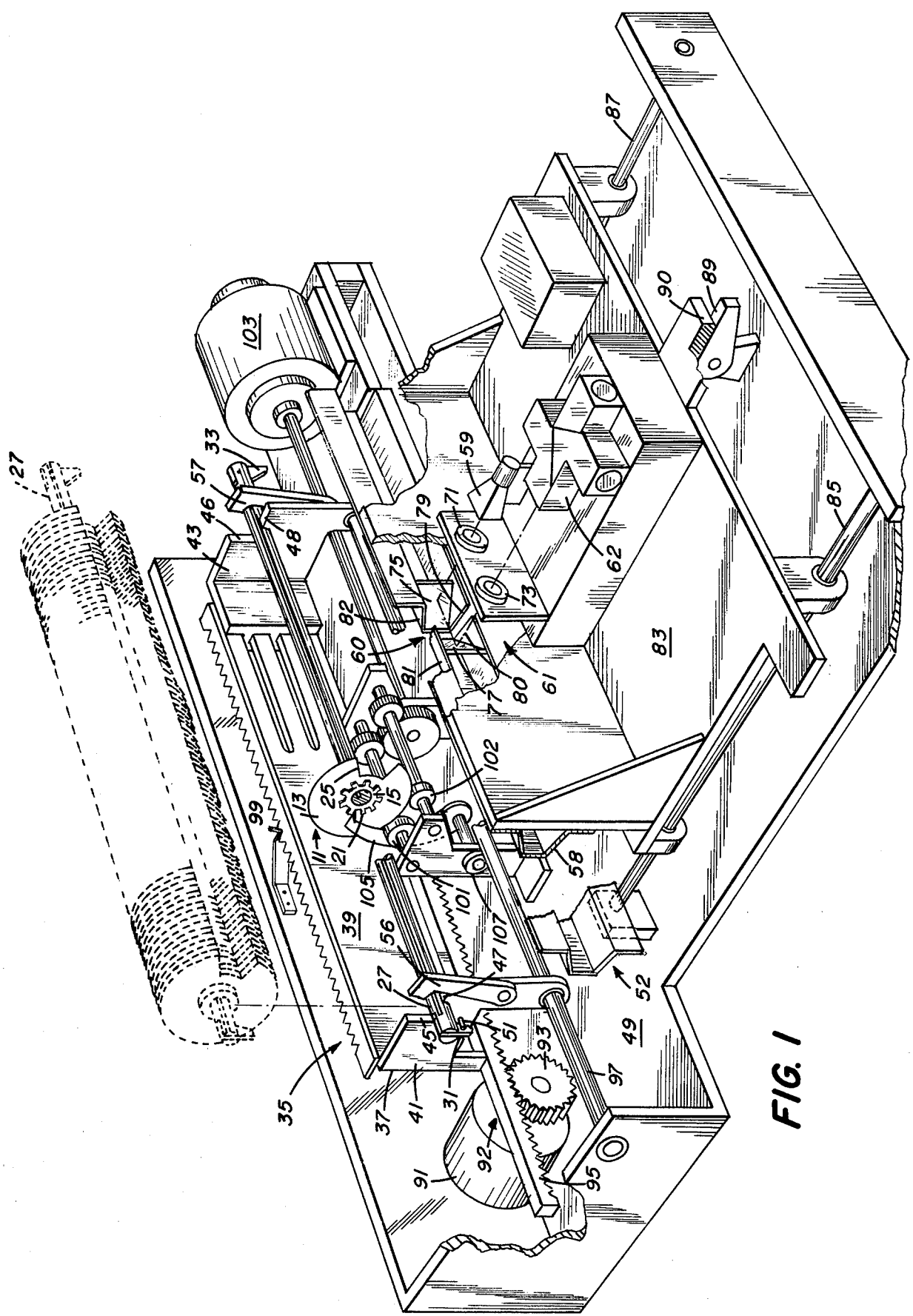
FIG. 1 is a partly cut-away perspective of the preferred embodiment revealing the means for positioning, indexing, and advancing the recording elements, and for positioning the viewing device.
Figure 4:
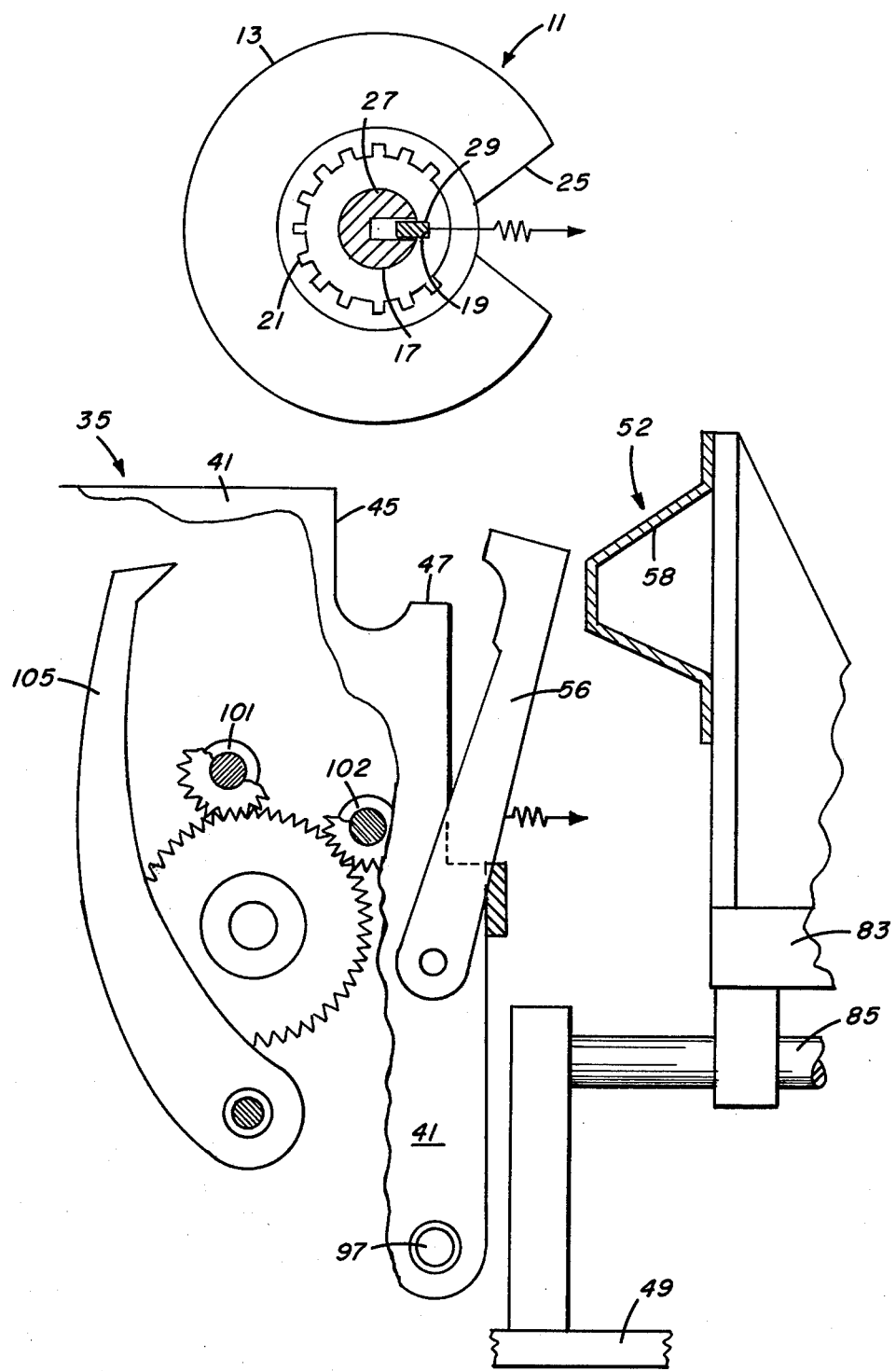
FIG. 4 is an orthographic end view of the apparatus of FIG. 1 showing the apparatus components in detail prior to the positioning of the recording elements thereon.

Referring now to the drawings, and especially to FIGS. 1 and 4, apparatus is depicted in accordance with a preferred embodiment of the present invention for viewing information on recording elements.

The recording elements are depicted most clearly in commonly assigned copending U.S. patent application Ser. No. 774,716, entitled PHOTOGRAPHIC FILM UNIT AND CARTRIDGE ASSEMBLY, filed on even date herewith in the name of Donald M. Harvey, the disclosure of which hereby is incorporated into the present application by reference. As there more fully described, but referring to the drawings of the present application, the photographic unit 11 includes a relatively stiff support disk 13 carried on a hub or core 15. The core is somewhat thicker than the rest of the disk and defines an aperture 17 (FIG. 4) having an irregular cross-section or key-way 19, and a plurality of locators depicted as radial projections or teeth 21. The support provides an imaging surface which bears a number of individual image-frames 23 (FIG. 6) spaced in a circular strip at a predetermined radius from the aperture 17 and interrupted at the same radius by a notched-out portion or open sector 25 where the support is discontinuous. For reasons that will become more apparent from the following description, the open sector is somewhat similar in configuration to the image-frames, but may subtend approximately twice the arc. For purposes of the present description, it should be noted that the disks can be stacked in tandem on a common axis, with the cores in facing engagement. The support disks then will be spaced in parallel relation perpendicular to the axis. Additionally, it should be noted that the open sectors 23 extend to the outer periphery of the disks at a known position relative to the key-way 19, and that each image frame 23 occupies an area in a known position relative to one of the locating teeth 21. Thus, the open sectors can be aligned through the key-way position, and the image frames can be positioned by the locating teeth.

The apparatus of the invention is intended to select and view respective recording elements from interchangeable sets of the elements accumulated for rotation on a common axis.

Referring now to FIGS. 1 through 4, the elements are collected and stacked one-engaging-the-next along a spindle 27. The spindle defines a cross-section which matches the apertures 17 in the recording elements and supports the elements through the center of the core with the imaging surfaces 13 extending normal to the longitudinal axis of the spindle. A key 29 is carried by the spindle and projects radially outwardly from the spindle cross-section to engage the key-way 19 in the disks. The key thus prevents rotation of the recording elements relative to the spindle and aligns the open sectors of all of the elements along a second axis, later called a displacement axis, which extends parallel to the spindle at the same radius as the open sectors 25. Suitable clamps, such as detents 31 and 33, (FIGS. 1 and 2) maintain the disks on the spindle and establish a reference for the rotational position of the spindle key and, therethrough, for the open sectors of the recording elements.

The recording elements accumulated on the spindle are convenient to handle when removed from the apparatus, and to interchange with other sets on the apparatus. The sets can be transported and supported in racks or cassettes, and located in the apparatus through the spindle, without directly contacting the recording elements. The spindle also supports the disks in parallel, properly-spaced relation without spacers other than the cores of the elements themselves.

The interchangeable sets of spindle and recording elements are adapted to be supported in the apparatus on a carriage 35 (FIG. 1) which includes an "L" shaped bracket 37 having back and end reference plates 39 and 41, respectively, and an adjustable end plate 43. The reference and adjustable plates define spindle supports at opposite ends of the carriage where slots 45 and 46, relieved on one side 47 and 48, receive the spindle ends with the key 29 facing the relieved side. The adjustable end plate 43 can then be moved toward the reference end plate 41 to clamp the recording elements against the reference end plate. The location of the slots 45 and 46 accurately determine the position of the spindle vertically and horizontally relative to a base plate 49. They also establish the rotational orientation of the spindle, in this case with the assistance of pins 51 which engage and prevent rotation of the spindle detents 31 and 33.

It will become apparent from the following description that the apparatus employs relative rotational indexing between the recording elements and a viewing head to position the head adjacent the desired frame of the information to be viewed. The apparatus also uses the notched-out portions or open sectors of the recording elements to accommodate the bulk of the viewing head at the same radius as the information-bearing strip. These objectives are obtained with the assistance of an override mechanism 52 that takes over from the spindle key 29 in determining the rotational orientation of the recording elements on the spindle. The override mechanism then releases a selected one of the recording elements for rotation in a viewing plane while maintaining the other elements with their open sectors aligned on the second or displacement axis.

Using the override mechanism, appropriate logic in the apparatus can control handling of the recording elements from a predetermined starting point through the viewing operation and back to the same point where the spindle key once again is engaged.

The spindle key 29 is slideably attached in spindle slot 53 (FIG. 2) by pins 54. The key can be retracted against the action of lead spring 55 until the key is flush with the surface of the spindle and the recording elements are released for rotation.

The override mechanism includes two lever arms 56 and 57, on carriage 35, which pivot against the spindle to release the key and to lock the spindle in position on the carriage. It also includes a sector key 58, to be described more fully hereinafter, that engages the recording elements in their open sectors to prevent rotation of all but the one element located in the viewing plane.

Figure 6:
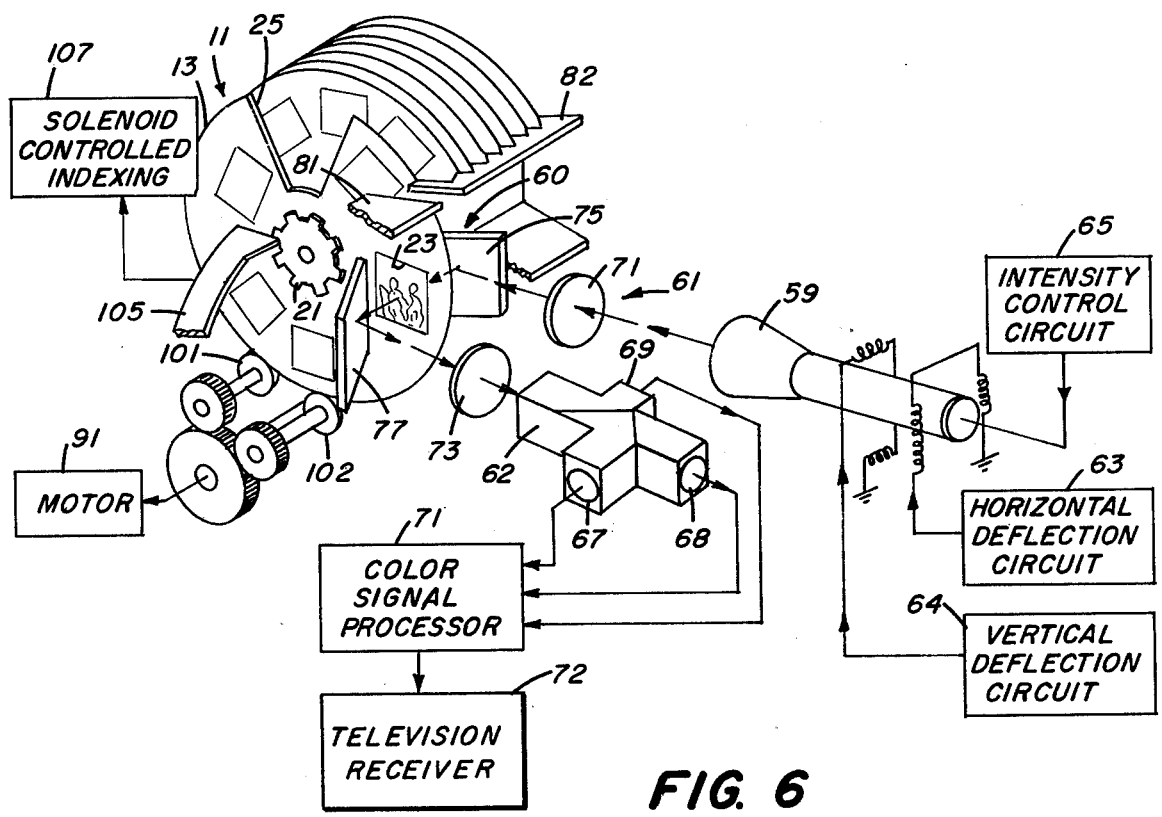
FIG. 6 is a partly perspective, partly schematic view showing the optical and electro-mechanical interfaces.

The viewing mechanism is depicted most clearly in FIGS. 1 and 6, including a source of illumination 59, a viewing gate 60 for locating the respective image frames in a projection plane normal to the spindle, projection optics 61 for directing illumination from the source 59 along a viewing or illumination axis through the gate 60, and a pick-up device 62 for displaying the projected image.

When used as a conventional projector, the illumination source would comprise a projection lamp, and the display device a projection screen. In the depicted embodiment, however, the source is a flying spot scanner, including suitable horizontal and vertical deflection circuits 63 and 64 with an intensity control 65. The display device is a three-color pick-up, including red, green and blue photocells 67, 68 and 69 coupled through suitable processing means 71 to a television receiver 72. Suitable circuitry can be selected from approaches available in the prior art including those described and referenced in U.S. Pat. Nos. 3,778,545, 2,303,960 and 2,648,723.

The projection optics include first and second lenses 71 and 73 and two mirrors 75 and 77 comprising a viewing head for focusing the illumination and directing it along the viewing axis through an image-frame perpendicular to the projection plane.

The gate is represented schematically in FIG. 1 by the opposed surfaces 79 and 80 of the sector key 58. While the disks might be sufficiently rigid to be self-supporting in the gate, positive clamping is preferred, and could be provided by moving one part 81 of the sector key towards the other part 82 to capture the disk therebetween during viewing.

Figure 5:
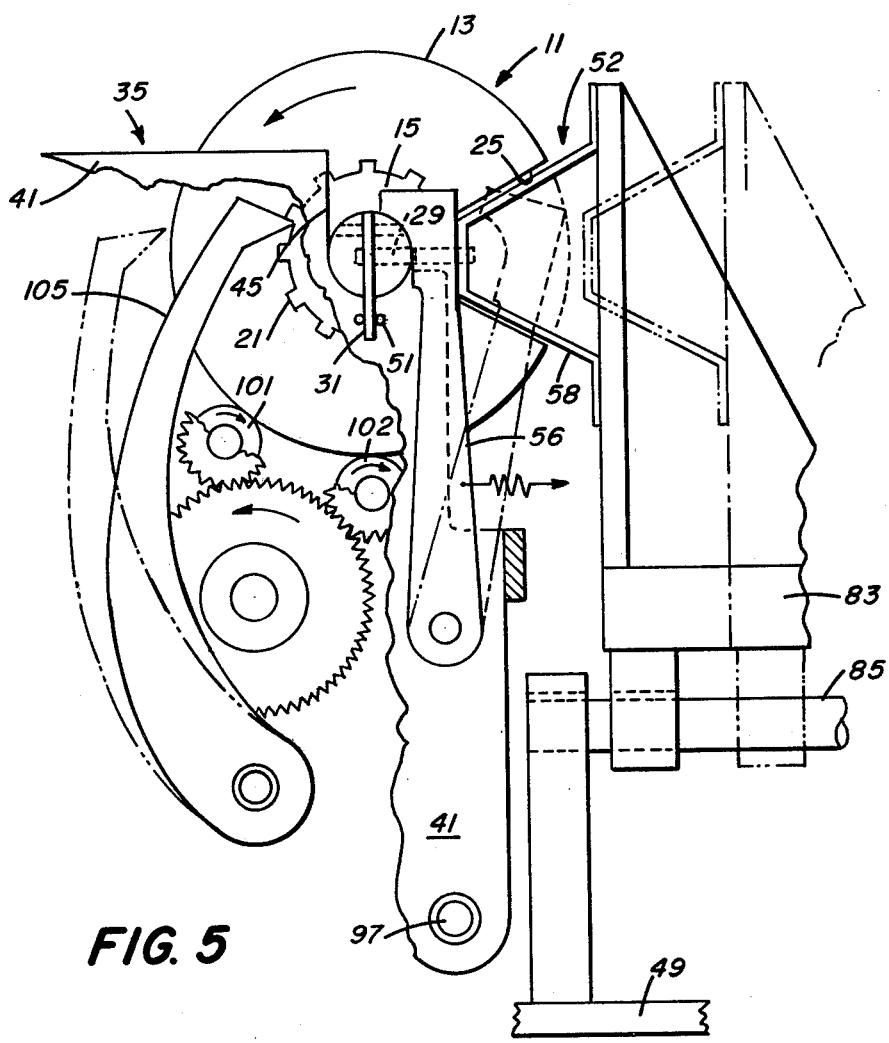
FIG. 5 is an orthographic end view of the apparatus of FIG. 1 showing the spindle components in detail with the recording elements assembled thereon.
Figure 2:
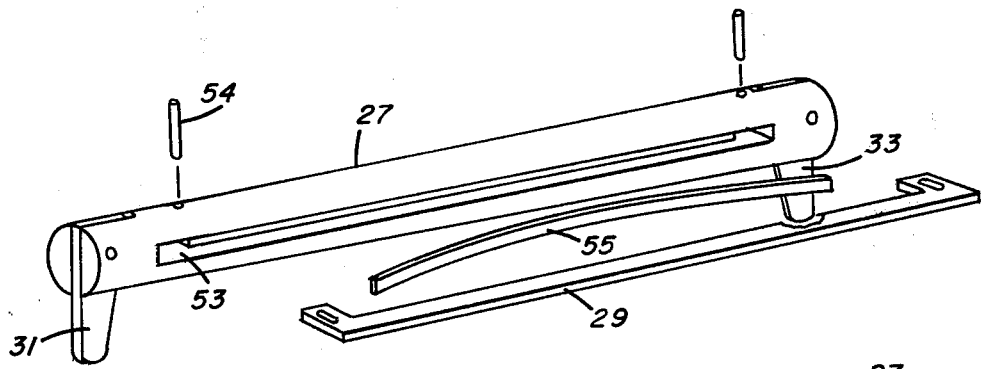
FIG. 2 is an exploded perspective of a spindle configuration for accumulating the recording elements on a common axis, and having a spring biased key therein for releasably aligning the recording elements with their open sectors parallel to the spindle.
Figure 3:
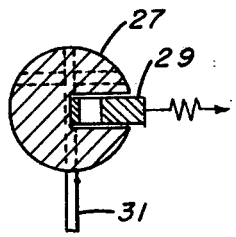
FIG. 3 is a cross-section through the spindle showing the key and spring of FIG. 2 in assembled relationship.

The viewing mechanism is carried on the base plate by a supporting table 83, which is retracted (FIG. 1) on guide shafts 85 and 87 to facilitate loading a respective disk set, and then is moved forward (left in FIG. 1) to the reading position (FIGS. 5 and 6). A latching finger 89 engages the table edge 90 and resiliently holds the supporting table forward once it is so positioned.

It should be recalled from the previous description that the open sectors of the disks are aligned along a second or displacement axis extending parallel to the spindle, and that the spindle supporting structure determines the vertical and rotational position of the open sectors. With the open sectors thus aligned, the viewing mechanism and especially its gate mechanism can be accommodated on the displacement axis, at the same radius as the information bearing strip. Such accommodation permits a more substantial gate structure without requiring increased spacing, other than provided by the thickness of the cores 15, between adjacent recording elements.

The aligned positions of the open sectors also facilitate longitudinal or axial indexing between the disks and the reading head without retracting the head. In the embodiment depicted, longitudinal indexing is accomplished by energizing motor 91 of indexing device 92. The motor is coupled to the carriage by a pinion 93 and rack 95, such that rotation of the motor will index the carriage along guide-shaft 97 in discrete increments equal to the spacing between adjacent disks. A detent 99 then holds the carriage in the desired position with a selected disk extending into the viewing gate.

Once the selected disk is located longitudinally, it is rotated on the spindle axis to position the desired frame for viewing. Rotational indexing between the selected disk and the viewing head is provided by peripheral driving devices 101 and 102, coupled to an incremental motor 103, and a locating finger 105 coupled to rotational solenoid 107. In operation, the locating finger is retracted, the motor 103 is energized to rotate one or more frames through the gate, and then the finger is moved into engagement with an appropriate projection 21 on the film core to finally determine the position of the desired frame in the gate. It should be understood of course, that the finger is also retracted during axial indexing.

Figure 7:
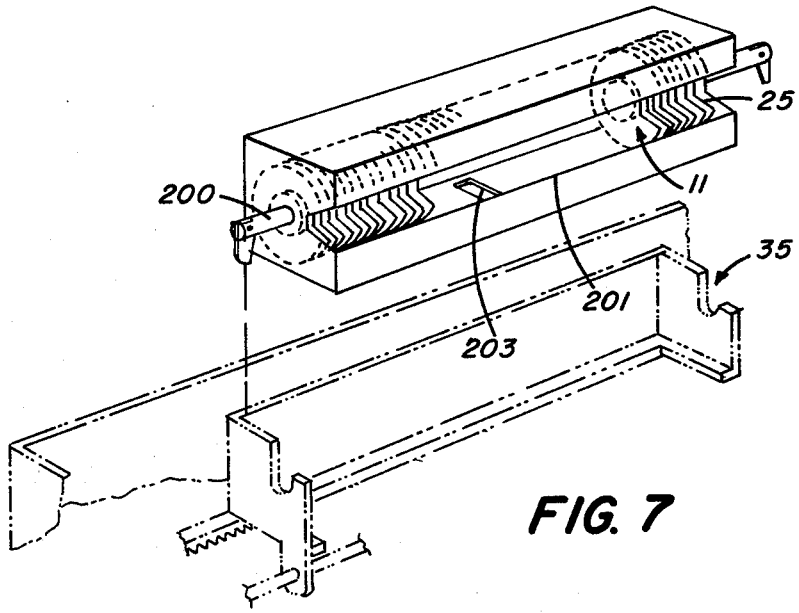
FIG. 7 is a partial perspective, partly in phantom, view showing an alternative embodiment of the apparatus and a cassette for the recording elements.

In FIG. 7 an alternate embodiment of accumulating means is depicted with a cartridge enclosure. The spindle 200 is similar in all respects to spindle 27. The cartridge is configured to fit within the carriage 35, and includes suitable apertures 201 and 203 for receiving the sector key and rotational indexing device, respectively. In other respects, the apparatus could be identical to that already described.

It should now be apparent that the present invention provides viewing apparatus having unique structural features offering significant advantages not available from prior teaching. Interchangeable sets of recording elements, such as photographic units, can be handled conveniently both off the apparatus and when exchanged with other sets. The recording elements can be supported in contacting relation without additional spacers, yet accommodate a viewing head that is significantly larger than the space between adjacent disks. Longitudinal indexing can be accomplished without withdrawing the viewing mechanism radially from the spindle, while a simple but reliable sector key maintains all but one of the disks aligned on the viewing axis passing through the viewing head parallel to the spindle.

Although the invention has been described in detail with particular reference to preferred embodiments thereof, it will be readily understood that variations and modifications can be effected within the spirit and scope of the invention as described hereinabove and as defined in the appended claims.

I claim:

1. Apparatus for viewing information from interchangeable sets of recording disks; the recording disks each having a periphery and an open segment extending inwardly from the periphery, the sets each including means for releasably aligning the recording elements on a common axis with their open segments in line parallel to the common axis; said apparatus comprising:
    a gate defining a viewing plane and a viewing axis, the viewing axis extending through said gate normal to said plane;
    means for removably supporting one of the interchangeable sets of recording disks with the open segments of the set in line on said viewing axis;
    indexing means for positioning a selected recording disk in said viewing plane for viewing;
    means for releasing the releasable aligning means to permit rotation of the selected recording disk in said viewing plane;
    a sector key extending along the viewing axis and receivable in the open segments of the disks other than the selected disk for maintaining such open segments aligned on the viewing axis;
    means for rotating the selected recording disk in said viewing plane to locate in said gate information to be viewed;
    a viewing head; and
    means for locating said viewing head on the viewing axis for viewing the information in said gate.

2. Apparatus having a source of illumination for illuminating selected images from interchangeable sets of photographic disks, each disk having a circular array of image frames interrupted by an open segment; the disks in each set being positioned with their open segments initially aligned, the disks being supported for rotation about a common axis passing through the center of the disks, said apparatus comprising:

a gate defining a plane and an illumination axis;

means for removably receiving a selected one of the interchangeable sets of photographic disks with their open segments aligned on said illumination axis;

means for directing illumination from the source along said illumination axis through the plane;

means for effecting relative positioning between the disks and said gate to position a selected disk in the plane;

a segment key positionable into the open segments of the disks other than the selected disk for maintaining alignment of such open segments on the illumination axis; and means for rotating the selected disk about the common axis to position a selected frame on the illumination axis.

3. Apparatus for selectively viewing information from interchangeable sets of recording elements; the recording elements each including a flat support bearing a circular array of information interrupted by an open section where the support is discontinuous; each set of recording elements including means for supporting the elements on a common axis and means for releasably aligning the recording elements with their open sections aligned parallel to the common axis; said apparatus comprising:

a viewing mechanism including a viewing head and defining a viewing axis and a viewing plane;

means for removably receiving a set of recording elements with the open sections aligned on said viewing axis;

means for effecting relative movement between the recording elements and said viewing head to position a selected recording element in said viewing plane;

means for releasing the aligning means to permit rotation of the selected recording element;

means for engaging the edges of the open sections of the elements not selected to maintain such open sections in alignment on said viewing axis; and means for rotationally positioning the selected recording element relative to said viewing head to permit viewing of the information on the selected element.

4. Apparatus for optically viewing selected image frames of interchangeable sets of film elements; the film elements each having a film disk, a hub supporting the film disk, a plurality of image frames disposed circularly about such hub and a peripheral notch, the hub having a central aperture and a keyway on the periphery thereof; each of said sets including a plurality of film elements, a spindle extending through the apertures of the plurality of film elements for rotatably supporting the same, and an elongate releasable key mounted on the spindle for engaging the keyways of the plurality of film elements of the set with their notches thereby aligned to define a channel along the set substantially parallel to the spindle axis; said apparatus comprising:

a gate defining a viewing position;

means for removably supporting one of the interchangeable sets of film elements with the spindle of the set oriented so that the channel is aligned with said gate;

means for moving the received set longitudinally relative to said gate, to align a selected one of the film elements with said gate;

a restraining member actuatable to engage and prevent rotation of those film elements not aligned with said gate;

means for disengaging said releasable key from engagement with the keyway and actuating said restraining member; and means for rotating the film element aligned with the gate to dispose selected frames thereof in said viewing position.

* * * * *